(12) United States Patent
Schell et al.

(10) Patent No.: US 6,238,791 B1
(45) Date of Patent: May 29, 2001

(54) COATED GLASS FIBERS, COMPOSITES AND METHODS RELATED THERETO

(75) Inventors: Philip L. Schell, Pittsburgh; Shrirang Ranade, Monroeville, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/059,809

(22) Filed: Apr. 14, 1998

Related U.S. Application Data

(63) Continuation-in-part of application No. 08/993,026, filed on Dec. 18, 1997.

(51) Int. Cl.$^7$ ....................................................... B32B 9/00

(52) U.S. Cl. ............................ 428/392; 428/375; 428/394

(58) Field of Search .................................. 428/375, 392, 428/394

(56) References Cited

U.S. PATENT DOCUMENTS

| | | | |
|---|---|---|---|
| 3,803,339 | 4/1974 | Speekman | 174/23 C |
| 3,920,614 * | 11/1975 | Kirimoto et al. | 260/63 |
| 3,923,715 * | 12/1975 | Dettre et al. | 260/29.6 |
| 4,002,819 | 1/1977 | Woytiuk | 174/23 C |
| 4,029,585 * | 6/1977 | Dettre et al. | 252/8.6 |
| 4,070,152 * | 1/1978 | Pentz | 8/115.6 |
| 4,115,605 * | 9/1978 | Hultman et al. | 427/377 |
| 4,137,209 | 1/1979 | Wong et al. | 260/29.6 |
| 4,172,066 | 10/1979 | Zweigle et al. | 260/29.6 |
| 4,326,094 | 4/1982 | Hunn | 174/23 R |
| 4,390,647 | 6/1983 | Girgis | 523/212 |
| 4,401,366 | 8/1983 | Hope | 350/96.23 |
| 4,457,583 | 7/1984 | Mayr et al. | 350/96.23 |
| 4,507,324 * | 3/1985 | Olive et al. | 428/395 |
| 4,511,477 | 4/1985 | McKinley et al. | 210/689 |
| 4,550,189 * | 10/1985 | Kelly et al. | 252/8.6 |
| 4,596,897 | 6/1986 | Gruhn | 174/36 |
| 4,605,818 | 8/1986 | Arroyo et al. | 174/107 |
| 4,655,545 | 4/1987 | Yamanishi et al. | 350/96.34 |
| 4,661,406 | 4/1987 | Gruhn et al. | 428/397 |
| 4,663,231 | 5/1987 | Girgis et al. | 428/378 |
| 4,701,345 | 10/1987 | Giatras et al. | 427/45.1 |
| 4,730,894 | 3/1988 | Arroyo | 385/113 |
| 4,742,140 * | 5/1988 | Greenwood et al. | 526/245 |
| 4,746,767 | 5/1988 | Gruhn | 174/36 |
| 4,762,750 | 8/1988 | Girgis et al. | 428/378 |
| 4,762,751 | 8/1988 | Girgis et al. | 428/378 |
| 4,781,433 | 11/1988 | Arroyo et al. | 360/96.23 |
| 4,795,678 | 1/1989 | Girgis | 428/391 |
| 4,815,813 | 3/1989 | Arroyo et al. | 350/96.23 |
| 4,818,060 | 4/1989 | Arroyo | 350/96.23 |

(List continued on next page.)

FOREIGN PATENT DOCUMENTS

| | | |
|---|---|---|
| 3330957A1 | 3/1985 | (DE) . |
| 0013477A1 | 7/1980 | (EP) . |
| 0107433A2 | 5/1984 | (EP) . |
| 0174424A1 | 3/1986 | (EP) . |
| 0284900A2 | 10/1988 | (EP) . |

(List continued on next page.)

OTHER PUBLICATIONS

Database WPI, Section Ch, Week 8931, Derwent Publication Ltd., Great Britain, AN 89–223294 & JP 01–158404, Jun. 21, 1989 to Sumitomo Electric Ind.

(List continued on next page.)

*Primary Examiner*—William Krynski
*Assistant Examiner*—J. M. Gray
(74) *Attorney, Agent, or Firm*—Andrew C. Siminerio; Ann Marie Cannoni

(57) ABSTRACT

The present invention provides fiber strands and products coated with a blend of a hydrophobic fluoroalkylacrylate polymer and an amine-reactive material or a polymerization reaction product of a hydrophobic fluoroalkylacrylate and a amine reactive monomeric material which are useful as reinforcements for nylon composites to inhibit hydrolysis.

29 Claims, 1 Drawing Sheet

U.S. PATENT DOCUMENTS

| | | | |
|---|---|---|---|
| 4,836,640 | 6/1989 | Gartside, III et al. | 350/96.23 |
| 4,867,526 | 9/1989 | Arroyo | 350/96.23 |
| 4,874,219 | 10/1989 | Arroyo et al. | 350/96.23 |
| 4,896,940 | 1/1990 | Kathiresan et al. | 350/96.23 |
| 4,946,237 | 8/1990 | Arroyo et al. | 350/96.23 |
| 4,948,829 | 8/1990 | Mitsuji et al. | 524/457 |
| 4,954,559 | 9/1990 | Den Hartog et al. | 524/507 |
| 4,971,419 | 11/1990 | Gartside et al. | 350/96.23 |
| 5,071,221 | 12/1991 | Fujitani et al. | 385/100 |
| 5,082,719 | 1/1992 | Arroyo | 428/219 |
| 5,100,954 * | 3/1992 | Itoh et al. | 524/805 |
| 5,109,457 | 4/1992 | Panuska et al. | 385/102 |
| 5,116,682 | 5/1992 | Chakravarti et al. | 428/395 |
| 5,131,064 | 7/1992 | Arroyo et al. | 385/102 |
| 5,146,046 | 9/1992 | Arroyo et al. | 174/23 R |
| 5,182,784 | 1/1993 | Hager et al. | 385/128 |
| 5,197,202 | 3/1993 | Jensen | 34/23 |
| 5,264,251 | 11/1993 | Geursen et al. | 427/389.9 |
| 5,342,686 | 8/1994 | Guersen et al. | 428/378 |
| 5,346,949 * | 9/1994 | Fukazawa | 524/805 |
| 5,349,003 * | 9/1994 | Kato et al. | 524/458 |
| 5,368,924 | 11/1994 | Merrill, Jr. et al. | 428/241 |
| 5,373,100 | 12/1994 | Arroyo et al. | 174/23 R |
| 5,389,442 | 2/1995 | Arroyo et al. | 428/396 |
| 5,573,857 | 11/1996 | Auger | 428/480 |
| 5,576,381 | 11/1996 | Bladel et al. | 524/544 |
| 5,619,606 | 4/1997 | Bonicel | 385/102 |
| 5,882,792 | 3/1999 | Moireau . | |

FOREIGN PATENT DOCUMENTS

| | | |
|---|---|---|
| 0306204A1 | 3/1989 | (EP) . |
| 0 488 489 | 6/1992 | (EP) . |
| 0528653 | 2/1993 | (EP) . |
| 1598807 | 9/1981 | (GB) . |
| 2164198 | 3/1986 | (GB) . |
| 2172410 | 10/1988 | (GB) . |
| 55158152 | 12/1980 | (JP) . |
| 60016837 | 4/1985 | (JP) . |
| 2261830 | 10/1990 | (JP) . |
| WO96/18683 | 6/1996 | (WO) . |
| WO98/06109 | 2/1998 | (WO) . |
| WO99/31541 | 6/1999 | (WO) . |

OTHER PUBLICATIONS

"Rhoplex® Acrylic Emulsions for Bonding and Finishing Dry–Laid Nonwoven Fabrics", Technical Bulletin of Rohn and Haas Company, undated.

"ROVENE® 5550", Technical Bulletin of Rohn and Haas Company (2/94).

"Chemicals for the Chemical Industry", Technical Bulletin of Rohm and Haas Company (Nov. 1997).

"CABLOC® Superabsorbent Polymers for Power & Communication Cable Systems" Technical Bulletin of Stockhausen, Inc. undated.

"Owens–Corning technology prevents water damage to optical fibers", *Wire Journal International* (Feb. 1996) at page 54.

"Building Better Nonwovens" Technical Bulletin of Rohm and Haas Company (1994).

"CABLOC 80HS Superabsorbent Polymer", Technical Bulletin of Stockhausen, Inc.

Material Safety Data Sheet for "CABLOC 80HS" Stockhausen, Inc. (Oct. 1994).

R. Klem et al. "Review of Synthetic and Starch–Graft Copolymer Superabsorbents", Grain Processing Corporation (Feb. 29, 1996).

Material Safety Data Sheet for Zonyl® 8300, CIBA Chemicals Division, Ciba–Geigy Corporation (Oct. 3, 1996).

Zonyl® 8300 Technical Bulletin of CIBA Specialty Chemicals (Mar. 27, 1997).

"Neptocofitech is the Solution", *Wire Technology Int'l* (May/Jun. 1996).

"PN–3716–L1 Material Safety Data Sheet", of H.B. Fuller Company (Jul. 1994).

"KEVLAR Non–Wicking Yarns" Technical Bulletin of E.I. duPont de Nemours and Company, undated.

"Nordson B–60 Electrostatic Dusting System", a Technical Bulletin of Electrostatic Technology, Inc. A subsidiary of Nordson Corporation, Branford. Undated.

"PN–3716–K Technical Data Sheet", Technical Bulletin of H. B. Fuller Company (Jul. 1994).

"PN–3716–L1 Technical Data Sheet", Technical Bulletin of H. B. Fuller Company (Jul. 1994).

"PN–3716–K Material Safety Data Sheet", of H. B. Fuller Company (Jul. 1994).

*Hawley's Condensed Chemical Dictionary*, (12th Edition, 1993) at p. 618, 850, 1075, 461, 435, 331, and 3.

*Kirk–Othmer Encyclopedia of Chemical Technology*, vol. 1 (1963) at p. 285, 305, 203–205, 259–297, 305–307, vol. 19 at pp. 90–95; vol. 21 at pp. 56–69.

*Encyclopedia of Polymer Science and Technology*, vol. 13 (1970) at pp. 130–139, 156–197; vol. 6 (1967) at pp. 505–712.

K. Loewenstein, *The Manufacturing Technology of Continuous Glass Fibres*, (3rd Ed. 1993) at pp. 237–289, 30–44, 47–60, 115–122, 126–135, 165–172, 219–222.

*Webster's New Collegiate Dictionary* (1977) at p. 1178.

"Water Lock® G–400 Series Superabsorbent Polymers", a Technical Bulletin of Grain Processing Corp. (Jan. 23, 1996).

"Test Procedures for Wicking and Hygroscopicity", a Technical Bulletin of Superior Cable Corporation.

I. Rubin, *Handbook of Plastic Materials and Technology* (1990) at pp. 955–1062, 1179–1215 and 1225–1271.

* cited by examiner

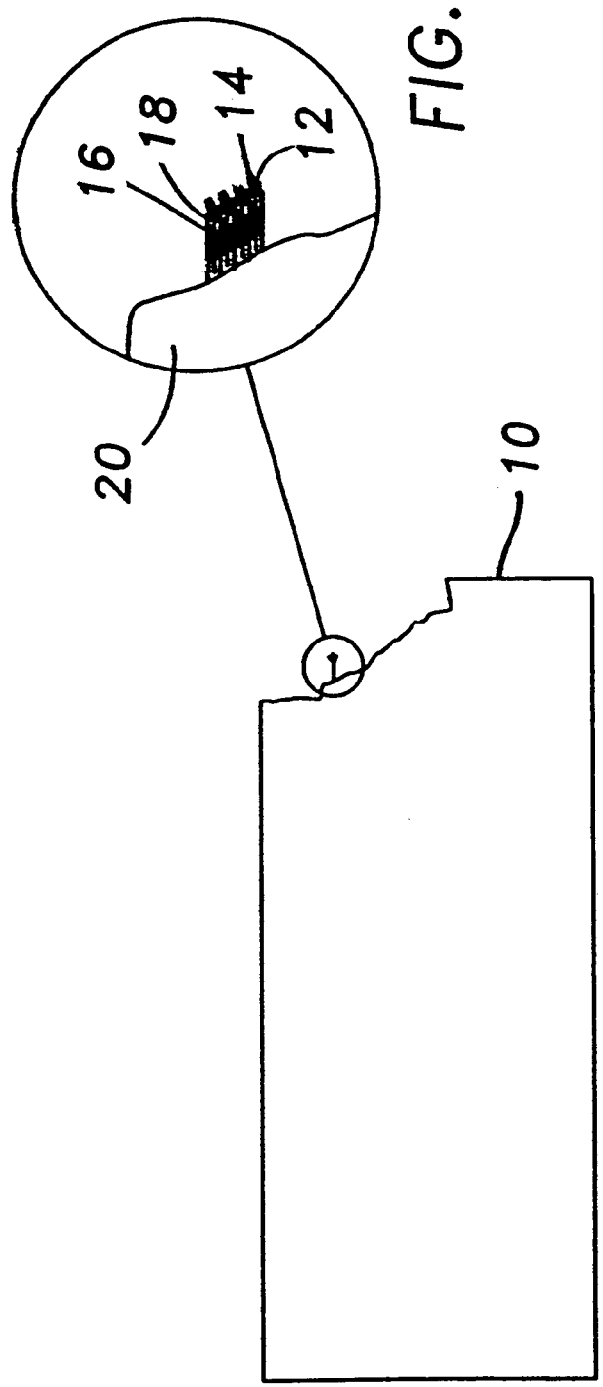

COATED GLASS FIBERS, COMPOSITES AND METHODS RELATED THERETO

CROSS REFERENCE TO RELATED APPLICATION

This patent application is a coninuation-in-part of pending U.S. patent application Ser. No. 08/993,026 filling date Dec. 18, 1997 of M. Girgis and P. Schell entitled "Coated Fiber Strands, Composites And Cables Including The Same And Related Methods".

FIELD OF THE INVENTION

This invention relates to coated glass fiber strands and, more particularly, to fiber strands having a hydrophobic, amine-reactive coating which can inhibit hydrolysis in reinforcing applications such as nylon composites.

BACKGROUND OF THE INVENTION

Reinforced composites are rapidly growing in popularity for such applications as automobile components, boat hulls and fishing rods. The coating on the reinforcement provides an interface between the reinforcement material, such as glass fiber strand, and the polymeric matrix material of the composite. The compatibility of the coating with the reinforcement material and the polymeric matrix material and strength of the bonding at the interface are important considerations in the selection of coating components. Moisture can attack this interface, as well as the surface of the glass and matrix resin, causing chain scission of the matrix resin, degradation and a decrease in molecular weight of the composite components and lower physical property values. Reinforcements having hydrolysis resistance are beneficial for applications in which the composite will be exposed to water and antifreeze solutions, such as engine radiator endcaps.

To repel water and inhibit wicking, U.S. Pat. No. 5,116,682 discloses yarn for heat stable fabrics which is coated with a perfluorinated polymer such as a perfluoroalkyl acrylic or methacrylic copolymer. U.S. Pat. No. 4,742,140 discloses oil- and water-repellent coatings for textile fabrics including copolymers of selected fluoroalkyl acrylate monomers, vinylidene chloride and alkyl acrylates or alkyl methacrylates.

Coated reinforcements are needed which can provide hydrolysis resistance to facilitate compatibility and bonding between the components of the coating on the fiber strands and the surrounding matrix material, such as nylon.

SUMMARY OF THE INVENTION

The present invention provides a strand comprising a plurality of fibers, at least one of the plurality of fibers having a layer of a coating composition on at least a portion of a surface thereof, the coating composition comprising a blend of a hydrophobic fluoroalkylacrylate polymer and an amine-reactive material selected from the group consisting of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones and (8) mixtures of materials (1)–(7).

Another aspect of the present invention is a strand comprising a plurality of fibers, at least one of the plurality of fibers having a layer of a coating composition on at least a portion of a surface thereof, the coating composition comprising a polymerization reaction product of a hydrophobic fluoroalkylacrylate monomer and an monomeric amine-reactive material selected from the group consisting of (1) unsaturated carboxylic acids having 3 to 10 carbon atoms and anhydrides thereof; (2) unsaturated epoxides; (3) cyanoacrylates; (4) acrylamides which are free of hydroxyl groups; (5) acrylonitriles; (6) unsaturated aldehydes; (7) unsaturated diketones and (8) mixtures of materials (1)–(7), the reaction product having amine-reactive functionality.

Yet another aspect of the present invention is a coating composition comprising a blend of a hydrophobic fluoroalkylacrylate polymer and an amine-reactive material selected from the group consisting of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones and (8) mixtures of materials (1)–(7).

Another aspect of the present invention is a coating composition comprising a polymerization reaction product of a hydrophobic fluoroalkylacrylate monomer and an monomeric amine-reactive material selected from the group consisting of (1) unsaturated carboxylic acids having 3 to 10 carbon atoms and anhydrides thereof; (2) unsaturated epoxides; (3) cyanoacrylates; (4) acrylamides which are free of hydroxyl groups; (5) acrylonitriles; (6) unsaturated aldehydes; (7) unsaturated diketones and (8) mixtures of materials (1)–(7), the reaction product having amine-reactive functionality.

Yet another aspect of the present invention is a reinforced polymeric composite comprising: (a) a reinforcement strand comprising a plurality of fibers, at least one of the plurality of fibers having a layer of a coating composition on at least a portion of a surface thereof, the coating composition comprising a blend of a hydrophobic fluoroalkylacrylate polymer and an amine-reactive material selected from the group consisting of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones and (8) mixtures of materials (1)–(7); and (b) a polymeric matrix material.

Another aspect of the present invention is a reinforced polymeric composite comprising: (a) a reinforcement strand comprising a plurality of fibers, at least one of the plurality of fibers having a layer of a coating composition on at least a portion of a surface thereof, the coating composition comprising a polymerization reaction product of a hydrophobic fluoroalkylacrylate monomer and an monomeric amine-reactive material selected from the group consisting of (1) unsaturated carboxylic acids having 3 to 10 carbon atoms and anhydrides thereof; (2) unsaturated epoxides; (3) cyanoacrylates; (4) acrylamides which are free of hydroxyl groups; (5) acrylonitriles; (6) unsaturated aldehydes; (7) unsaturated diketones and (8) mixtures of materials (1)–(7), the reaction product having amine-reactive functionality; and (b) a polymeric matrix material.

Yet another aspect of the present invention is a method for inhibiting hydrolysis of a polyamide matrix material in a reinforced polyamide composite, comprising: (a) mixing a polyamide matrix material with a reinforcement strand to form a reinforced mixture, the reinforcement strand comprising a plurality of fibers, at least one of the plurality of fibers having a layer of a coating composition on at least a portion of a surface thereof, the coating composition comprising a blend of a hydrophobic fluoroalkylacrylate polymer and an amine-reactive material selected from the group consisting of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones and (8) mixtures of materials (1)–(7); and (b) forming an essentially solid composite from the reinforced mixture.

Another aspect of the present invention is a method for inhibiting hydrolysis of a polyamide matrix material in a reinforced polyamide composite, comprising: (a) mixing a polyamide matrix material with a reinforcement strand to form a reinforced mixture, the reinforcement strand comprising a plurality of fibers, at least one of the plurality of fibers having a layer of a coating composition on at least a portion of a surface thereof, the coating composition comprising a polymerization reaction product of a hydrophobic fluoroalkylacrylate monomer and an monomeric amine-reactive material selected from the group consisting of (1) unsaturated carboxylic acids having 3 to 10 carbon atoms and anhydrides thereof; (2) unsaturated epoxides; (3) cyanoacrylates; (4) acrylamides which are free of hydroxyl groups; (5) acrylonitriles; (6) unsaturated aldehydes; (7) unsaturated diketones and (8) mixtures of materials (1)–(7), the reaction product having amine-reactive functionality; and (b) forming an essentially solid composite from the reinforced mixture.

BRIEF DESCRIPTION OF THE DRAWINGS

The foregoing summary, as well as the following detailed description of the preferred embodiments, will be better understood when read in conjunction with the appended drawings. In the drawings:

FIG. 1 is a front elevational view of a composite, partially broken away to show a coated strand according to the present invention; and FIG. 1a is an enlarged view of a portion of the composite of FIG. 1.

DETAILED DESCRIPTION OF THE PREFERRED EMBODIMENTS

The fiber strands of the present invention are useful for reinforcing polymeric matrix materials, such as nylons, to form composites having good physical properties, such as strength, modulus and impact resistance under both dry and moist conditions. In nylon reinforcement applications, exposure of the composite to sources of moisture, such as solids, liquid or gases containing water, liquids containing ethylene glycol, and solids such as 2-ethylhexanoic acid potassium salts can hydrolyze the amine, —$NH_2$ and/or amide groups of the nylon, causing chain scission, lower molecular weight and lower physical property values.

The fiber strands of the present invention have a coating which can provide hydrolysis resistance to the coated fibers to facilitate compatibility and bonding between the components of the coating on the fiber strands and the surrounding thermoplastic matrix materials and improve retention of physical properties after exposure to moisture. This hydrolysis resistance is beneficial for applications in which the composite will be exposed to water and antifreeze solutions, such as radiator endcaps.

Referring to the drawings, wherein like numerals indicate like elements throughout, there is shown in FIGS. 1 and 1a a preferred embodiment of a composite 10 comprising one or more strands 12 according to the present invention. Each strand 12 comprises a plurality of fibers 14. As used herein, "strand" means a plurality of individual fibers. The term "fiber" means an individual filament.

A layer 16 of a coating composition is present upon at least a portion of a surface 18 of the fiber(s), and preferably upon the entire surfaces 18 of the fibers 14. This layer 16 can be present directly upon the fibers as a sizing composition or as a secondary or outer coating applied over at least a portion of a sizing composition. As used herein, the terms "size", "sized" or "sizing" refer to a coating composition applied to fibers immediately after formation. The term "secondary coating" refers to a coating composition applied secondarily to the fibers of the strands after the sizing composition is applied, and preferably at least partially dried.

Referring now to FIG. 1, the layer 16 of the coating composition comprises (1) a blend of one or more hydrophobic fluoroalkylacrylate polymers and one or more amine-reactive materials and/or (2) a polymerization reaction product of one or more hydrophobic fluoroalkylacrylate monomers and one or more monomeric amine-reactive materials (hereinafter "Reaction Product"), the Reaction Product having amine-reactive functionality.

Preferably, the coating composition comprises a blend of one or more hydrophobic fluoroalkylacrylate polymers and one or more amine-reactive materials. As used herein, "blend" means a uniform combination of (a) one or more fluoroalkylacrylate polymers and (b) one or more amine-reactive materials. See *Hawley's* at page 157, which is hereby incorporated by reference.

As used herein, "hydrophobic" means that the fluoroalkylacrylate monomer or polymer is not compatible with, does not have an affinity for and/or is not capable of dissolving in water, i.e., it repels water. See *Hawley's Condensed Chemical Dictionary*, (12th Ed. 1993) at page 618. Also, the fluoroalkylacrylate monomer or polymer preferably repels, preferably is not compatible with, does not have an affinity for and/or is not capable of dissolving in oils, such as petroleum and petroleum-derived mineral oils, vegetable or animal oils, or solid predominately hydrocarbon unctuous materials, such as waxes, fats or gelled oils. See *Hawley's* (12th Ed. 1993) at page 850, which is hereby incorporated by reference.

Preferred fluoroalkylacrylate polymers for use in the blends of the present invention are perfluoroalkylacrylate copolymers. Useful perfluoroalkylacrylate polymers are the ZONYL® fluoropolymers which are commercially available from Ciba-Geigy Corporation of Greensboro, North Carolina. A preferred perfluoroalkylacrylate polymer is ZONYL® 8300[1], which is a nonionic dispersion of about 14 to about 20 weight percent perfluoroalkylacrylate copolymer, about 1 to about 5 weight percent of an ethoxylated aliphatic alcohol, about 4 weight percent hexylene glycol and about 70 to about 85 weight percent water, according to a Material Safety Data Sheet for ZONYL® 8300 (Oct. 3, 1996), which is hereby incorporated by reference. According to the manufacturer's representative, the perfluoroalkylacrylate copolymer used in ZONYL® 8300 is similar to those disclosed in U.S. Pat. No. 4,742,140, which is hereby incorporated by reference. [1]ZONYL® 8300 fluoroacrylate polymer is commercially available from Ciba-Geigy Corporation of Greensboro, N.C.

U.S. Pat. No. 4,742,140 discloses oil and water repellent fluoroalkylacrylate polymers suitable for use in the blends of the present invention which are polymerization reaction products of one or more fluoroalkyl acrylate monomers, vinylidene chloride, and one or more alkyl acrylates or alkyl methacrylates.

Non-limiting examples of suitable fluoroalkylacrylate monomer components disclosed in U.S. Pat. No. 4,742,140 include mixtures of perfluoroalkylethylacrylate monomers of the formula (I):

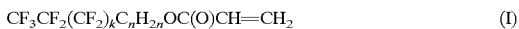
$$CF_3CF_2(CF_2)_kC_nH_{2n}OC(O)CH=CH_2 \qquad (I)$$

where k is an even integer ranging from 1 to 14 and n is an integer ranging from 1 to 4. These fluoroalkylacrylate monomer components can also be used to form the Reaction Product with the monomeric amine-reactive material, which will be discussed in detail below.

Preferably, such mixtures consist essentially of 0–10 weight percent monomer where k is an even integer which is 4 or less; 45–75 weight percent monomer wherein k is 6; 20–40 weight percent monomer wherein k is 8; 1–20 weight percent monomer wherein k is 10; and 0–5 weight percent monomer wherein k is 12. Preferably, the perfluoroalkylethylacrylate monomer mixture, as disclosed in U.S. Pat. No. 4,742,140, consists essentially of 0–8 weight percent monomer where k is an even integer which is 4 or less; 45–65 weight percent monomer wherein k is 6; 25–35 weight percent monomer wherein k is 8; 5–15 weight percent monomer wherein k is 10; and 0–5 weight percent monomer wherein k is 12.

According to U.S. Pat. No. 4,742,140, the vinylidene chloride content can range from about 10 to about 35 weight percent of the fluoropolymer composition. Other halogenated vinyl monomers such as vinyl chlorides and vinylidene fluorides are also suitable for forming the fluoroalkylacrylate polymers suitable for use in the present invention.

Suitable alkyl acrylate or alkyl methacrylate monomers disclosed in U.S. Pat. No. 4,742,140 have linear, cyclic or branched-chain alkyl groups having chain lengths of 2 to 18 carbon atoms. Non-limiting examples of such monomers include ethyl acrylate, propyl acrylate, butyl acrylate, cyclohexyl acrylate, isoamyl acrylate, isodecyl acrylate, isodecyl methacrylate, 2-ethylhexyl methacrylate, octyl acrylate, lauryl acrylate, cetyl acrylate, stearyl acrylate and stearyl methacrylate.

Minor amounts of other monomers (about 0.1 to 5 weight percent) can be included to improve cross-linking, latex stability and substantively of the fluoropolymer, such as for example chlorohydroxypropyl methacrylate, chlorohydroxypropyl acrylate, poly(oxyethylene) acrylates or methacrylates, N-methylol acrylamide, N-methylol methacrylamide, hydroxyethyl acrylate or hydroxyethyl methacylate.

Fluoroalkylacrylate polymers can be produced by conventional emulsion polymerization techniques such as are disclosed in U.S. Pat. No. 4,742,140 at col. 3, line 42—col. 4, line 12. The amine-reactive material can be included in the polymerization reaction to form the Reaction Product discussed above, if desired.

The fluoroalkylacrylate polymer of the blend can be present as a solid, but preferably is present in an aqueous dispersion with one or more surfactants, such as a cationic or nonionic emulsifying agent. Non-limiting examples of suitable emulsifying agents include cationic emulsifying agents such as dodecyltrimethylammonium acetate, trimethyltetradecylammonium chloride, hexadecyltrimethylammonium bromide, trimethyloctadecylammonium chloride and nonionic emulsifying agents such as condensation products of ethylene oxide with 12–18 carbon atom fatty alcohols, 12–18 carbon atom fatty acids, alkylphenols having 12–18 carbon atoms in the alkyl group, 12–18 carbon atom alkanethiols and 12–18 carbon atom alkyl amines.

Based upon the weight of the total solids of the coating composition, the fluoroalkylacrylate polymer of the blend or Reaction Product of the composition generally comprises about 1 to about 99 weight percent of the coating composition on a total solids basis, preferably comprises about 25 to about 75 weight percent, and more preferably comprises about 30 to about 60 weight percent of the coating composition.

As discussed above, the coating composition of the layer 16 comprises one or more amine-reactive materials present as a blend with the fluoroalkylacrylate polymer or one or more polymerization Reaction Products of one or more monomeric amine-reactive materials and fluoroalkylacrylate monomer(s), the Reaction Product having amine-reactive functionality.

The amine-reactive materials of the blend are selected from the group consisting of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones; and (8) mixtures of materials (1)–(7).

Suitable monomeric amine-reactive materials for forming the polymerization Reaction Product with the fluoroalkylacrylate monomer(s) are monomers of (1) unsaturated carboxylic acids having 3 to 10 carbon atoms and anhydrides thereof; (2) epoxides; (3) cyanoacrylates; (4) acrylamides which are free of hydroxyl groups; (5) acrylonitriles; (6) aldehydes; (7) diketones; and (8) mixtures of materials (1)–(7). The chemical reaction product can be formed by any polymerization technique which is well known to those skilled in the art, such as addition polymerization, free radical polymerization of emulsion polymerization as discussed above. If more information on polymerization techniques is needed, see G. Odian, *Principles of Polymerization* (2d Ed. 1981), which is hereby incorporated by reference. The ratio of monomeric amine-reactive material to fluoroalkylacrylate monomer on a total solids basis can range from about 1:10 to about 1:1.

The amine-reactive material or Reaction Product of the monomeric amine-reactive material and fluoroalkylacrylate polymer has functionality which is capable of reacting with amine end groups, —$NH_2$ end groups and/or amide groups of the polymeric matrix material, such as are typically present in nylons. Preferably, the amine-reactive material or Reaction Product has acid functionality, such as a carboxyl group, which is capable of reacting with amine end groups, —$NH_2$ end groups and/or amide groups of the polymeric matrix material. As used herein, "acid functional" means that the amine-reactive material is a substance that can give up a proton to a base in a chemical reaction; a substance that is capable of reacting with a base to form a salt; or a compound that produces hydronium ions, $H_3O^+$, in aqueous solution. *See Hawley's* at page 15 and K. Whitten et al., *General Chemistry*, (1981) at page 192, which are hereby incorporated by reference.

Non-limiting examples of useful unsaturated carboxylic acids having 3 to 10 carbon atoms include acrylic acid, methacrylic acid, ethacrylic acid, itaconic acid, maleic acid, fumaric acid, cinnamic acid, crotonic acid, aconitic acid, citraconic acid, sorbic acid, tetrahydrophthalic acid and mixtures thereof. Monomers, homopolymers and copolymers of such unsaturated carboxylic acids are also useful in the present invention.

A preferred acrylic acid-derived homopolymer for use in a blend according to the present invention is DISPEX™ A40 polyacrylic acid which is neutralized with ammonium hydroxide which is commercially available from Allied Colloids of Suffolk, Va. Other examples of polyacrylic acids useful in the present invention are VERSICOL™ E7, VER- SICOL™ E9 and VERSICOL™ E11, which are commercially available from Allied Colloids.

A non-limiting example of an addition polymerization Reaction Product which is useful in the present invention can be formed from perfluoroalkylethylacrylate monomers such as are shown in formula (I) above, vinylidene chloride and acrylic acid. Such a Reaction Product includes the following randomly arranged repeating units (a), (b) and (c), as follows:

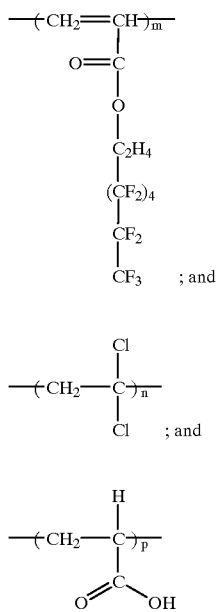

wherein m ranges from about 5 to about 25 weight percent of the Reaction Product, n ranges from about 5 to about 35 weight percent of the Reaction Product, and p ranges from about 30 to about 90 weight percent of the Reaction Product on a total weight basis. Preferably the Reaction Product has a molecular weight ranging from about 5,000 to about 500,000.

As discussed above, the amine-reactive material can be an epoxide. Useful epoxides contain at least one epoxy or oxirane group in the molecule, such as polyglycidyl ethers of polyhydric alcohols or thiols. An example of a suitable commercially available polyepoxide for forming the blend is EPON® 880 epoxy resin, which is an epoxy functional polyglycidyl ether of bisphenol A prepared from bisphenol-A and epichlorohydrin and is commercially available from Shell Chemical Company of Houston, Tex.

To form the reaction product, it is preferred that the epoxide be unsaturated, for example glycidyl acrylate, glycidyl methacrylate or an unsaturated epoxide represented by the formula (I):

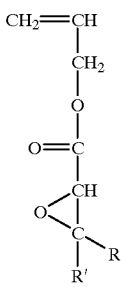

where R is selected from the group consisting of H and $CH_3$ and R' is an alkyl group represented by the formula $C_nH_{2n+1}$ where n is a integer ranging from 1 to 4, and mixtures thereof.

Non-limiting examples of useful cyanoacrylate amine-reactive materials include alkyl 2-cyanoacrylates such as methyl 2-cyanoacrylate, ethyl 2-cyanoacrylate, isopropyl 2-cyanoacrylate and butyl 2-cyanoacrylate.

Non-limiting examples of useful acrylamide amine-reactive materials which are free of hydroxyl groups include acrylamide, methacrylamide, N-isopropylacrylamide, N-tert-butylacrylamide, N,N'-methylenebisacrylamide, n-vinyl pyrrolidone and mixtures thereof. The absence of hydroxyl groups in the acrylamide can increase hydrophobicity of the acrylamide and lessen attraction of water to the reinforcement/polymer matrix interface, thereby inhibiting hydrolysis.

Useful acrylonitrile amine-reactive materials include acrylonitrile, methacrylonitrile and mixtures thereof.

Non-limiting examples of useful aldehyde amine-reactive materials include acrolein (acraldehyde), methacrolein, crotonaldehyde, and mixtures thereof.

Useful diketones include 1,3-diketones (β-diketones) such as 2-methacryloyloxyethylacetoacetate β-diketone, 2,4-pentanedione and 2,4-hexanedione.

The amount of amine-reactive material present in the blend of the coating composition can range from about 1 to about 99 weight percent of the coating composition on a total solids basis, preferably about 25 to about 75 weight percent, and more preferably about 40 to about 70 weight percent.

In a preferred embodiment, the coating composition comprises a blend of about 10 to about 50 weight percent ZONYL® 8300 perfluoroalkylacrylate emulsion and about 30 to about 70 weight percent DISPEX™ A-40 polyacrylic acid homopolymer on a total solids basis. Preferably one or more coupling agents and lubricants such as are discussed below are included in the coating composition.

The coating composition preferably comprises one or more coupling agents such as organo silane coupling agents, transition metal coupling agents, phosphonate coupling agents, aluminum coupling agents, amino-containing Werner coupling agents and mixtures thereof. These coupling agents typically have dual functionality. Each metal or silicon atom has attached to it one or more groups which can react or compatibilize with the fiber surface and/or the components of the aqueous sizing composition. As used herein, the term "compatibilize" means that the groups are chemically attracted, but not bonded, to the fiber surface and/or the components of the sizing composition, for example by polar, wetting or solvation forces. Examples of hydrolyzable groups include:

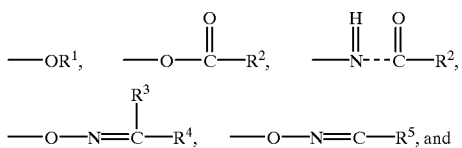

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of useful functional organo silane coupling agents include gamma-aminopropyltrialkoxysilanes, gamma-isocyanatopropyltriethoxysilane, vinyl-trialkoxysilanes, glycidoxypropyltrialkoxysilanes and ureidopropyltrialkoxysilanes. Preferred functional organo silane coupling agents include A-187 gamma-glycidoxy-propyltrimethoxysilane, A-174 gamma-methacryloxypropyltrimethoxysilane, A-1100 gamma-aminopropyltriethoxysilane silane coupling agents, A-1108 amino silane coupling agent and A-1160 gamma-ureidopropyltriethoxysilane (each of which are commercially available from OSi Specialties, Inc. of Tarrytown, N.Y.). The organo silane coupling agent can be at least partially hydrolyzed with water prior to application to the fibers, preferably at about a 1:1 stoichiometric ratio or, if desired, applied in unhydrolyzed form.

Suitable transition metal coupling agents include titanium, zirconium, yttrium and chromium coupling agents. Suitable titanate coupling agents and zirconate coupling agents are commercially available from Kenrich Petrochemical Company. Suitable chromium complexes are commercially available from E.I. duPont de Nemours of Wilmington, Del. The amino-containing Werner-type coupling agents are complex compounds in which a trivalent nuclear atom such as chromium is coordinated with an organic acid having amino functionality. Other metal chelate and coordinate type coupling agents known to those skilled in the art can be used herein.

The amount of coupling agent can range from about 1 to about 20 weight percent of the coating composition on a total solids basis, and preferably about 1 to about 10 weight percent.

The coating composition can further comprise one or more starches, thermoplastic film-forming materials or thermosetting film forming materials chemically different from the fluoroacrylate polymer and amine-reactive material discussed above, for example the thermoplastic film-forming material can be chemically different if it does not contain any fluorine atoms. Preferably the polymeric film-forming materials form a generally continuous film when applied to the surface 18 of the fibers. Generally, the amount of polymeric film-forming materials can range from about 1 to about 95 weight percent of the coating composition on a total solids basis, preferably about 20 to about 75 weight percent and more preferably about 40 to about 50 weight percent.

Useful thermoplastic polymeric film-forming materials include vinyl polymers, thermoplastic polyesters, polyolefins, polyamides, thermoplastic polyurethanes, acrylic polymers and mixtures thereof. A non-limiting example of a useful thermoplastic polyurethane is WITCOBOND® W-290H which is commercially available from Witco Chemical Corp. of Chicago, Ill. Useful thermosetting materials include thermosetting polyesters, epoxy materials, vinyl esters, phenolics, aminoplasts, thermosetting polyurethanes and mixtures thereof. A non-limiting example of a useful thermosetting polyurethane is BAYBOND PU130 which is commercially available from Bayer AG of Germany.

The coating composition can comprise one or more fiber lubricants, such as cationic, non-ionic or anionic lubricants and mixtures thereof. Non-limiting examples of such lubricants are glass fiber lubricants which include amine salts of fatty acids, alkyl imidazoline derivatives such as CATION X which is commercially available from Rhone Poulenc of Princeton, N.J., acid solubilized fatty acid amides, acid solubilized polyunsaturated fatty acid amides, condensates of a fatty acid and polyethylene imine and amide substituted polyethylene imines, such as EMERY® 6717, a partially amidated polyethylene imine commercially available from Henkel Corporation of Kankakee, Ill. Generally, the amount of lubricant can range from about 1 to about 15 weight percent of the coating composition on a total solids basis.

The coating composition can comprise emulsifying agents for emulsifying the film-forming material. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can range from about 0.5 to about 10 weight percent of the coating composition on a total solids basis.

The coating composition can comprise one or more aqueous soluble, emulsifiable or dispersible wax materials which can be selected from vegetable, animal, mineral, synthetic or petroleum waxes, for example. Preferably, the wax has a high degree of crystallinity and is obtained from a paraffinic source, such as a microcrystalline wax. Generally, the amount of wax can range from about 1 to about 10 weight percent of the secondary aqueous coating composition on a total solids basis.

The coating composition can also include one or more aqueous dispersible or soluble plasticizers, such as phthalates, trimellitates and adipates. The amount of plasticizer generally can range from about 5 to about 15 weight percent of the coating composition on a total solids basis.

Other additives such as flame retardants (including antimony trioxides and halogenated phosphates), antioxidants, antistatic agents, nucleating agents such as sodium benzoate, clarifying agents, optical brighteners and impact modifiers can also be included in the coating composition. The amount of additive can range from about 1 to about 10 weight percent of the coating composition on a total solids basis.

Water (preferably deionized) is preferably included in the coating composition in an amount sufficient to facilitate application of a generally uniform coating upon the fibers of the strand. Generally, the weight percentage of solids of the coating composition can range from about 1 to about 100 weight percent. Preferably, the weight percentage of solids is about 5 to about 25 weight percent and, more preferably, about 8 to about 15 weight percent. Although not preferred, it should be understood that minor amounts of water miscible or water soluble organic solvents can be included in the coating composition, so long as the essential characteristics of the coating composition are not adversely affected.

The coating composition of the present invention can be prepared by any suitable method well known to those skilled in the art. The fluoroalkylacrylate polymer and amine-reactive material can be blended or pre-reacted to form the reaction product prior to adding other film-forming materials (if present), coupling agents, lubricants, additives and water, as discussed above. Preferably each of the components is diluted with water prior to addition to the mixture. If necessary, the plasticizer or lubricant can be pre-emulsified prior to addition to the mixture. The components of the composition are then mixed to form a generally homogenous mixture prior to application to the strand.

The coating composition (present as a sizing composition or secondary coating) is applied to fibers, strands, yarns or the like of natural or man-made inorganic or organic materials and combinations thereof. Fibers believed to be useful in the present invention and methods for preparing and processing such fibers are discussed at length in the *Encyclopedia of Polymer Science and Technology*, Vol. 6 (1967) at pages 505–712, which is hereby incorporated by reference.

Suitable natural fibers include those derived directly from animals and vegetables, such as cotton, cellulose, natural rubber, flax, ramie, hemp, jute, sisal and wool. Suitable natural inorganic fibers derived from mineral sources include glass and polycrystalline fibers, such as ceramics including silicon carbide, and carbon or graphite.

The preferred fibers for use in the present invention are glass fibers. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, "The Manufacturing Technology of Glass Fibres", (3d Ed. 1993) at pages 30–44, 47–60, 115–122 and 126–135, which are hereby incorporated by reference.

Suitable man-made fibers include polyamides, polyesters, acrylics, polyolefins, polyurethanes, vinyl polymers, polyimides, polyether sulfones, polyphenyl sulfones, polyetherketones, polyphenylene oxides, polyphenylene sulfides, polyacetals, synthetic rubbers or spandex polyurethanes. It is understood that blends or copolymers of any of the above materials and combinations of fibers formed from any of the above materials can be used in the present invention, if desired.

The present invention will now be discussed generally in the context of glass fiber strands. However, one of ordinary skill in the art would understand that the coating compositions of the present invention are useful for coating any of the fibers discussed above.

The coating composition of the layer 14 is preferably present upon surfaces 18 of the fibers 12 as a sizing, although the layer 16 can be present as a secondary coating applied over a sizing composition which is different from the coating composition of the layer 14 discussed above, having either different amount(s) of similar components or one or more chemically different components. Suitable components for such a sizing composition can include film-forming materials such as thermosetting and thermoplastic film-forming materials; lubricants; coupling agents such as organo silane coupling agents; waxes; emulsifiers and water such as are discussed above. Non-limiting examples of suitable sizing compositions are disclosed in K. Loewenstein, *The Manufacturing Technology of Continuous Glass Fibres*, (3d Ed. 1993) at pages 237–289 and U.S. Pat. Nos. 4,390,647 and 4,795,678, each of which is hereby incorporated by reference. A useful sizing composition includes PLURACOL V-10 polyoxyalkylene polyol (commercially available from BASF of Wyandotte, Mich.); EMERY 6717 partially amidated polyethylene imine lubricant (commercially available from Henkel Corporation of Kankakee, Ill.) and A-1100 aminosilane (commercially available from OSi Specialties, inc. of Danbury Conn.).

The layer 14 of coating composition can be applied in many ways, for example by contacting the filaments with a static or dynamic applicator, such as a roller or belt applicator, spraying, dipping or other means. The fibers are preferably dried at room temperature or in a dryer at elevated temperatures to remove excess moisture from the fibers and, if present, cure any curable sizing or secondary coating composition components. After drying, the sizing composition is typically present on the fibers in an amount between about 0.1 percent and about 5 percent by weight.

An important aspect of the present invention is that the fiber strands of the present invention coated with the layer 14 of coating composition are useful for reinforcing polymeric matrices, such as thermoplastic or thermosetting polymeric matrices, to form composites. Non-limiting examples of suitable polymeric thermoplastic matrix materials include polyolefins, polyamides, thermoplastic polyurethanes and thermoplastic polyesters such as are discussed above, and vinyl polymers such as polyvinyl chloride and polystyrenes; and mixtures thereof. Thermoplastic elastomeric materials useful as matrix materials in the present invention include styrene-butadiene rubbers, styrene-acrylontrile (SAN) copolymers, styrene-butadiene-styrene (SBS) copolymers and acrylonitrile-butadiene-styrene (ABS) copolymers. Further examples of useful thermoplastic materials include polyimides, polyether sulfones, polyphenyl sulfones, polyetherketones, polyphenylene oxides, polyphenylene sulfides, polyacetals, polyvinyl chlorides and polycarbonates. Also included as suitable thermoplastic materials are any of the above thermoplastics which are modified by an unsaturated monomer.

Preferably the thermoplastic matrix material is a polyamide such as nylon. Suitable nylon matrix materials include nylon 6, nylon 6,6, nylon 12. Non-limiting examples of useful nylon matrix materials include RILSAN (commercially available from ElfAtochem), ZYTEL (commercially available from E. I. duPont de Nemours of Wilmington, Del.), ULTRAMID (commercially available from BASF) and CAPRON (commercially available from Allied Signal). The water repellent fluoroalkyl acrylate polymers and amine-reactive materials provide hydrolysis resistance to the coated fibers to facilitate compatibility and bonding between the components of the coating on the fiber strands and the surrounding thermoplastic matrix materials. This hydrolysis resistance is beneficial for applications in which the composite will be exposed to water and antifreeze solutions, such as radiator endcaps.

Thermosetting matrix materials useful in the present invention can include thermosetting polyesters, vinyl esters, epoxides, phenolics, aminoplasts, thermosetting polyurethanes, derivatives and mixtures thereof. Suitable thermosetting polyesters include the AROPOL products which are commercially available from Ashland Chemical Inc. of Columbus, Ohio. Examples of useful vinyl esters include Derakane® products such as Derakane® 470–45, which are commercially available from Dow Chemical USA of Midland, Mich. Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical.

Other components which can be included with the polymeric matrix material and reinforcing material in the composite are, for example, colorants or pigments, lubricants or process aids, ultraviolet light (UV) stabilizers, antioxidants, other fillers, and extenders.

The amount of glass fiber strand included in the composite is preferably less than about 65 weight percent of the total weight of the composite, and more preferably less than about 45 weight percent.

The fiber strand reinforcing material can be dispersed in the matrix by hand or any suitable automated feed or mixing device which distributes the reinforcing material generally evenly throughout the thermoplastic matrix material. For example, the reinforcing material can be dispersed in the thermoplastic matrix material by dry blending all of the components concurrently or sequentially.

The thermoplastic matrix material 20 and strand 12 can be formed into a composite 10, shown in FIG. 1, by a variety of methods which are dependent upon such factors as the type of thermoplastic matrix material used. For example, suitable methods for forming the composite include direct molding or extrusion compounding followed by injection molding. Useful extrusion equipment includes single or twin screw extruders commercially available from Werner Pfleiderer and Welding Engineers, respectively. Methods and apparatus for forming the composite by the above methods is discussed in I. Rubin, *Handbook of Plastic Materials and Technology* (1990) at pages 955–1062, 1179–1215 and 1225–1271, which are hereby incorporated by reference.

The coated strands of the present invention are also useful in a wide variety of other applications, such as forming fabric, mats, yarn and roving, to name a few. In an alternative embodiment for reinforcing telecommunications cables, an outer layer comprising one or more hydrophilic or hydrophobic materials can be applied over the coating composition. The hydrophilic materials of the outer layer can absorb or swell when in contact with water or participate in a chemical reaction with the water to form, for example, a viscous gel-like solution which blocks or inhibits further ingress of water into the interstices of the telecommunications cable. As used herein, "absorb" means that the water penetrates the inner structure or interstices of the hydrophilic material and is substantially retained therein. See *Hawley's Condensed Chemical Dictionary* at page 3, which is hereby incorporated by reference. "Swell" means that the hydrophilic material expands in size or volume. See Webster's New Collegiate Dictionary (1977) at page 1178, which is hereby incorporated by reference. Preferably, the hydrophilic material swells after contact with water to at least one and one-half times its original weight, and more preferably about two to about six times its original weight. Suitable hydrophilic materials include "superabsorbents", which are hydrophilic materials which can absorb and retain under pressure many times their own weight of aqueous fluids such as water. See R. Klem et al., "Review of Synthetic and Starch-Graft Copolymer Superabsorbents" a publication of Grain Processing Corporation (1983), which is hereby incorporated by reference. Useful superabsorbents include starch-graft copolymers, modified gums and cellulosics, and synthetic superabsorbents. This outer layer can comprise about 1 to about 10 percent of the total weight of the coated fiber strand, and preferably comprises about 1 to about 5 percent of the total weight of the coated fiber strand.

The coated strand can be incorporated as reinforcement in a telecommunications cable, for example an electrical cable or optical fiber cable. When the outer protective layer surrounding the cable is breached, or at splices or joints in the optical fiber cable, water can enter the interior of the cable, possibly causing corrosion of the optical fibers. Also, freezing temperatures can cause the water to freeze and expand, thereby crushing the optical fibers. It is important that the reinforcement strand inhibit wicking or capillary movement of water through or along the strand and inhibit contact of water with the optical fibers.

The present invention also provides a method for inhibiting hydrolysis of a polyamide matrix material in a reinforced polyamide composite. In a first step, the method comprises mixing a polymeric matrix material, such as a polyamide, with a reinforcement strand to form a reinforced mixture. The reinforcement strand comprises a plurality of fibers, at least one of which has a layer of a coating composition thereon which comprises a blend of a hydrophobic fluoroalkylacrylate polymer and an amine-reactive material and/or a Reaction Product such as is discussed above. The reaction product has amine-reactive functionality. An essentially solid composite is formed from the reinforced mixture in a manner discussed above.

From the foregoing description, it can be seen that the present invention provides coatings and coated fiber strands which can inhibit hydrolysis in composites such as polyamide composites.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, We claim:

1. A strand comprising a plurality of glass fibers, at least one of the plurality of fibers having a layer of a coating composition on at least a portion of a surface thereof, the coating composition comprising a blend of a hydrophobic fluoroalkylacrylate polymer and an amine-reactive material which is an unsaturated carboxylic acid having 3 to 10 carbon atoms.

2. The fiber strand according to claim 1, wherein the fluoroalkylacrylate polymer is a perfluoroalkylacrylate polymer.

3. The fiber strand according to claim 2, wherein the perfluoroalkylacrylate polymer is formed from perfluoroalkyl acrylate monomer components represented by the following formula (I):

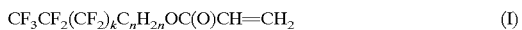

$$CF_3CF_2(CF_2)_k C_n H_{2n} OC(O)CH=CH_2 \qquad (I)$$

where k is an even integer ranging from 1 to 14 and n is an integer ranging from 1 to 4.

4. The fiber strand according to claim 1, wherein the fluoroalkylacrylate polymer is an addition polymerization reaction product of a fluoroalkyl acrylate monomer component, vinylidene chloride and an alkyl acrylate monomer component.

5. The fiber strand according to claim 4, wherein the fluoroalkyl acrylate monomer component comprises a perfluoroalkylethylacrylate monomer.

6. The fiber strand according to claim 4, wherein the fluoroalkyl acrylate monomer component comprises a mixture of perfluoroalkylethylacrylate monomers.

7. The fiber strand according to claim 4, wherein the alkyl acrylate monomer component comprises a mixture of alkyl acrylate monomers.

8. The fiber strand according to claim 1, wherein the fluoroalkylacrylate polymer comprises about 25 to about 75 weight percent of the coating composition on a total solids basis.

9. The fiber strand according to claim 8, wherein the fluoroalkylacrylate polymer comprises about 30 to about 60 weight percent of the coating composition on a total solids basis.

10. The fiber strand according to claim 1, wherein the amine-reactive material is an unsaturated carboxylic acid selected from the group consisting of acrylic acid, methacrylic acid, ethacrylic acid, itaconic acid, maleic acid, fumaric acid, cinnamic acid, crotonic acid, aconitic acid, citraconic acid, sorbic acid, tetrahydrophthalic acid and mixtures thereof.

11. The fiber strand according to claim 1, wherein the amine-reactive material comprises about 25 to about 75 weight percent of the coating composition on a total solids basis.

12. The fiber strand according to claim 11, wherein the amine-reactive material comprises about 40 to about 70 weight percent of the coating composition on a total solids basis.

13. The fiber strand according to claim 1, wherein the coating composition further comprises a coupling agent.

14. A strand comprising a plurality of fibers, at least one of the plurality of fibers having a layer of a coating composition on at least a portion of a surface thereof, the coating composition comprising a blend of a hydrophobic perfluoroalkylacrylate polymer and an amine-reactive material which is an unsaturated carboxylic acid having 3 to 10 carbon atoms.

15. The strand according to claim 14, wherein the fibers are formed from fiberizable materials selected from the group consisting of inorganic materials, organic materials and combinations thereof.

16. The strand according to claim 15, wherein the fibers are formed from an inorganic material which is glass.

17. The fiber strand according to claim 14, wherein the perfluoroalkylacrylate polymer is formed from perfluoroalkyl acrylate monomer components represented by the following formula (I):

$$CF_3CF_2(CF_2)_kC_nH_{2n}OC(O)CH=CH_2 \quad (I)$$

where k is an even integer ranging from 1 to 14 and n is an integer ranging from 1 to 4.

18. The fiber strand according to claim 14, wherein the fluoroalkylacrylate polymer comprises about 25 to about 75 weight percent of the coating composition on a total solids basis.

19. The fiber strand according to claim 18, wherein the fluoroalkylacrylate polymer comprises about 30 to about 60 weight percent of the coating composition on a total solids basis.

20. The fiber strand according to claim 14, wherein the amine-reactive material is an unsaturated carboxylic acid selected from the group consisting of acrylic acid, methacrylic acid, ethacrylic acid, itaconic acid, maleic acid, fumaric acid, cinnamic acid, crotonic acid, aconitic acid, citraconic acid, sorbic acid, tetrahydrophthalic acid and mixtures thereof.

21. The fiber strand according to claim 14, wherein the amine-reactive material comprises about 25 to about 75 weight percent of the coating composition on a total solids basis.

22. The fiber strand according to claim 14, wherein the amine-reactive material comprises about 40 to about 70 weight percent of the coating composition on a total solids basis.

23. The fiber strand according to claim 14, wherein the coating composition further comprises a coupling agent.

24. A strand comprising a plurality of fibers, at least one of the plurality of fibers having a layer of a coating composition on at least a portion of a surface thereof, the coating composition comprising a blend of a hydrophobic perfluoroalkylacrylate polymer and an amine-reactive material selected from the group consisting of (1) unsaturated carboxylic acids having 3 to 10 carbon atoms (2) epoxides; (3) cyanoacrylates; (4) acrylamides which are free of hydroxyl groups; (5) acrylonitriles; (6) aldehydes; (7) diketones and (8) mixtures of materials (1)–(7).

25. A strand comprising a plurality of fibers, at least one of the plurality of fibers having a layer of a coating composition on at least a portion of a surface thereof, the coating composition comprising a blend of a hydrophobic fluoroalkylacrylate polymer and an amine-reactive material which is an unsaturated carboxylic acids having 3 to 10 carbon atoms, wherein the fluoroalkylacrylate polymer is an addition polymerization reaction product of a fluoroalkyl acrylate monomer component, vinylidene chloride and an alkyl acrylate monomer component.

26. The fiber strand according to claim 25, wherein the fluoroalkyl acrylate monomer component comprises a perfluoroalkylethylacrylate monomer.

27. The fiber strand according to claim 25, wherein the fluoroalkyl acrylate monomer component comprises a mixture of perfluoroalkylethylacrylate monomers.

28. The fiber strand according to claim 25, wherein the alkyl acrylate monomer component comprises a mixture of alkyl acrylate monomers.

29. A strand comprising a plurality of fibers, at least one of the plurality of fibers having a layer of a coating composition on at least a portion of a surface thereof, the coating composition comprising a blend of a hydrophobic fluoroalkylacrylate polymer and an amine-reactive material selected from the group consisting of (1) unsaturated carboxylic acids having 3 to 10 carbon atoms (2) epoxides; (3) cyanoacrylates; (4) acrylamides which are free of hydroxyl groups; (5) acrylonitriles; (6) aldehydes; (7) diketones and (8) mixtures of materials (1)–(7), wherein the fluoroalkylacrylate polymer is an addition polymerization reaction product of a fluoroalkyl acrylate monomer component, vinylidene chloride and an alkyl acrylate monomer component.

* * * * *